United States Patent
Huang

(10) Patent No.: US 9,268,147 B2
(45) Date of Patent: Feb. 23, 2016

(54) AUTOSTEREOSCOPIC DISPLAY DEVICE AND AUTOSTEREOSCOPIC DISPLAY METHOD USING THE SAME

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 107 days.

(21) Appl. No.: 14/273,892

(22) Filed: May 9, 2014

(65) Prior Publication Data

US 2015/0226973 A1 Aug. 13, 2015

(30) Foreign Application Priority Data

Feb. 12, 2014 (TW) ................... 103104511 A

(51) Int. Cl.
*G02B 27/22* (2006.01)
*G03B 21/602* (2014.01)
*H04N 13/04* (2006.01)

(52) U.S. Cl.
CPC .......... *G02B 27/2214* (2013.01); *G02B 27/225* (2013.01); *G03B 21/602* (2013.01); *H04N 13/0402* (2013.01); *H04N 13/0404* (2013.01)

(58) Field of Classification Search
CPC ............. G03B 21/206; G03B 21/2033; G03B 21/208; G02B 27/48; G02B 27/2214; G02B 27/225; H04N 13/0402; H04N 13/0404
USPC ................... 353/7, 10, 94, 38; 352/57, 58, 61; 348/54, 59; 359/458, 466, 479, 475
See application file for complete search history.

(56) References Cited

U.S. PATENT DOCUMENTS 3,187,339 A * 6/1965 Clay ................... G02B 27/2214
352/61
3,814,513 A * 6/1974 Nims ..................... G03B 35/24
353/7

(Continued)

FOREIGN PATENT DOCUMENTS

TW 201312161 3/2013
TW 201323927 6/2013
TW 201329518 7/2013

OTHER PUBLICATIONS

Lawrence Bogaert, Youri Meuret, Stijn Roelandt, Aykut Avci, Herbert De Smet, and Hugo Thienpont, "Demonstration of a multiview projection display using decentered microlens arrays", Optics Express 26106, vol. 18, No. 25 (2010).

(Continued)

*Primary Examiner* — William C Dowling
(74) *Attorney, Agent, or Firm* — Hauptman Ham, LLP

(57) ABSTRACT

An autostereoscopic display method includes providing a plurality of projectors. Each of the projectors is configured for providing a lamp image unit, each of which has a plurality of lamp images actuated in sequence. The lamp images respectively project to different directions to form a projection angle therebetween. The lamp image units are projected onto a screen. The lamp image units are projected to a first lens array of the screen for respectively guiding the lamp image units to an image plane of the screen, such that the lamp image units are adjacent to each other and connected end to end on the image plane. At least two adjacent lamp image units are guided to the same second lenticular lens of a second lens array of the screen for enlarging and combining the projection angles and projecting the lamp image units to an observing surface.

10 Claims, 8 Drawing Sheets

(56) References Cited

U.S. PATENT DOCUMENTS

| | | | |
|---|---|---|---|
| 7,425,070 B2 * | 9/2008 | Hsu | G03B 21/625 |
| | | | 348/E13.027 |
| 7,648,243 B2 * | 1/2010 | Shestak | G02B 27/2214 |
| | | | 353/10 |
| 7,894,419 B2 | 2/2011 | Turpin et al. | |
| 7,944,465 B2 | 5/2011 | Goulanian et al. | |
| 8,011,786 B2 * | 9/2011 | Hentschke | G02B 27/2214 |
| | | | 348/59 |
| 2013/0057830 A1 | 3/2013 | Tsai et al. | |
| 2013/0147854 A1 | 6/2013 | Huang | |
| 2013/0176538 A1 * | 7/2013 | Huang | G02B 27/2214 |
| | | | 353/7 |

OTHER PUBLICATIONS

Takahiro Ishinabe, Tohru Kawakami and Tatsuo Uchida, "High-Resolution Floating Autostereoscopic 3D Display Based on Iris-Plane-Dividing Technology", SID Int. Symp. Digest Tech. Papers 17.5, pp. 225-228 (2012).

T. Kanebako and Y. Takaki, "Time-multiplexing display module for high-density directional display," in Stereoscopic Displays and Applications XIX, A. Woods, N. Holliman, and J. Merritt, eds., Proc. SPIE-IS&T Electronic Imaging 6803, 68030P (2008).

* cited by examiner

AUTOSTEREOSCOPIC DISPLAY DEVICE AND AUTOSTEREOSCOPIC DISPLAY METHOD USING THE SAME

RELATED APPLICATIONS

This application claims priority to Taiwan Application Serial Number 103104511, filed Feb. 12, 2014, which is herein incorporated by reference.

BACKGROUND

1. Field of Invention

The present invention relates to an autostereoscopic display device.

2. Description of Related Art

Exploiting the binocular parallax of humans, a stereoscopic display provides two different images respectively to the two eyes of an observer, such that the observer can experience a stereoscopic image. An autostereoscopic display, unlike other kinds of stereoscopic displays which require special glasses to distinguish left-eye and right-eye images, provides a plurality of images by using a plurality of light sources, in which the images are projected to different spatial positions. The eyes of an observer can receive different images so that the observer perceives a stereoscopic image when his or her eyes correspond to any two of the spatial positions respectively. Autostereoscopic display technology overcomes the problems associated with the use of glasses in stereoscopic display technology, and has become an area of major development in recent times.

SUMMARY

An aspect of the present invention is to provide an autostereoscopic display method includes providing a plurality of projectors. Each of the projectors is configured for providing a lamp image unit. Each of the lamp image units has a plurality of lamp images actuated in sequence. The lamp images respectively project to different directions to form a projection angle therebetween. The lamp image units are projected onto a screen. The lamp image units are projected to a first lens array of the screen for respectively guiding the lamp image units to an image plane of the screen, such that the lamp image units are adjacent to each other and connected end to end on the image plane. At least two adjacent of the lamp image units are guided to the same second lenticular lens of a second lens array of the screen for enlarging and combining the projection angles of the at least two lamp image units and projecting the lamp image units to an observing surface.

In one or more embodiments, projecting the lamp image units onto the screen further includes adjusting a first focus length of each of a plurality of first lenticular lenses of the first lens array and a second focus length of each of the second lenticular lenses, such that the first focus length is greater than the second focus length.

In one or more embodiments, projecting the lamp image units onto the screen further includes off-axis projecting the lamp image units. The axis is an optical axis of each of a plurality of first lenticular lenses of the first lens array.

In one or more embodiments, in the act of projecting the lamp image units to the first lens array of the screen, the lamp image units passing through the same first lenticular lens of the first lens array are not adjacent to each other on the image plane.

In one or more embodiments, the method further includes the following act. The projectors are arranged along a single direction or in a stacked and vertically unaligned configuration.

In one or more embodiments, the method further includes collimating the lamp image units.

Another aspect of the present invention is to provide an autostereoscopic display device including a plurality of projectors and a screen. Each of the projectors is configured for providing a lamp image unit. Each of the lamp image units has a plurality of lamp images actuated in sequence. The lamp images respectively project to different directions to form a projection angle therebetween. The screen has an image plane, and the screen includes a first lens array and a second lens array. The first lens array is configured for guiding the lamp image units to the image plane, such that the lamp image units are adjacent to each other and connected end to end on the image plane. The second lens array is disposed opposing the first lens array. The second lens array is configured for projecting the lamp image units to an observing surface. The second lens array includes a plurality of second lenticular lenses. Each of the second lenticular lenses is configured for enlarging and combining the projection angles of at least two of the lamp image units adjacent to each other.

In one or more embodiments, the second lens array has a pitch, and each of the lamp image units on the image plane has a width. The pitch is greater than the width.

In one or more embodiments, the first lens array includes a plurality of first lenticular lenses. Each of the first lenticular lenses has an optical axis, and the lamp image units are off-axis from the optical axis.

In one or more embodiments, the first lens array includes a plurality of first lenticular lenses. The lamp image units passing through the same first lenticular lens are not adjacent to each other on the image plane.

DETAILED DESCRIPTION

Figure 1A:
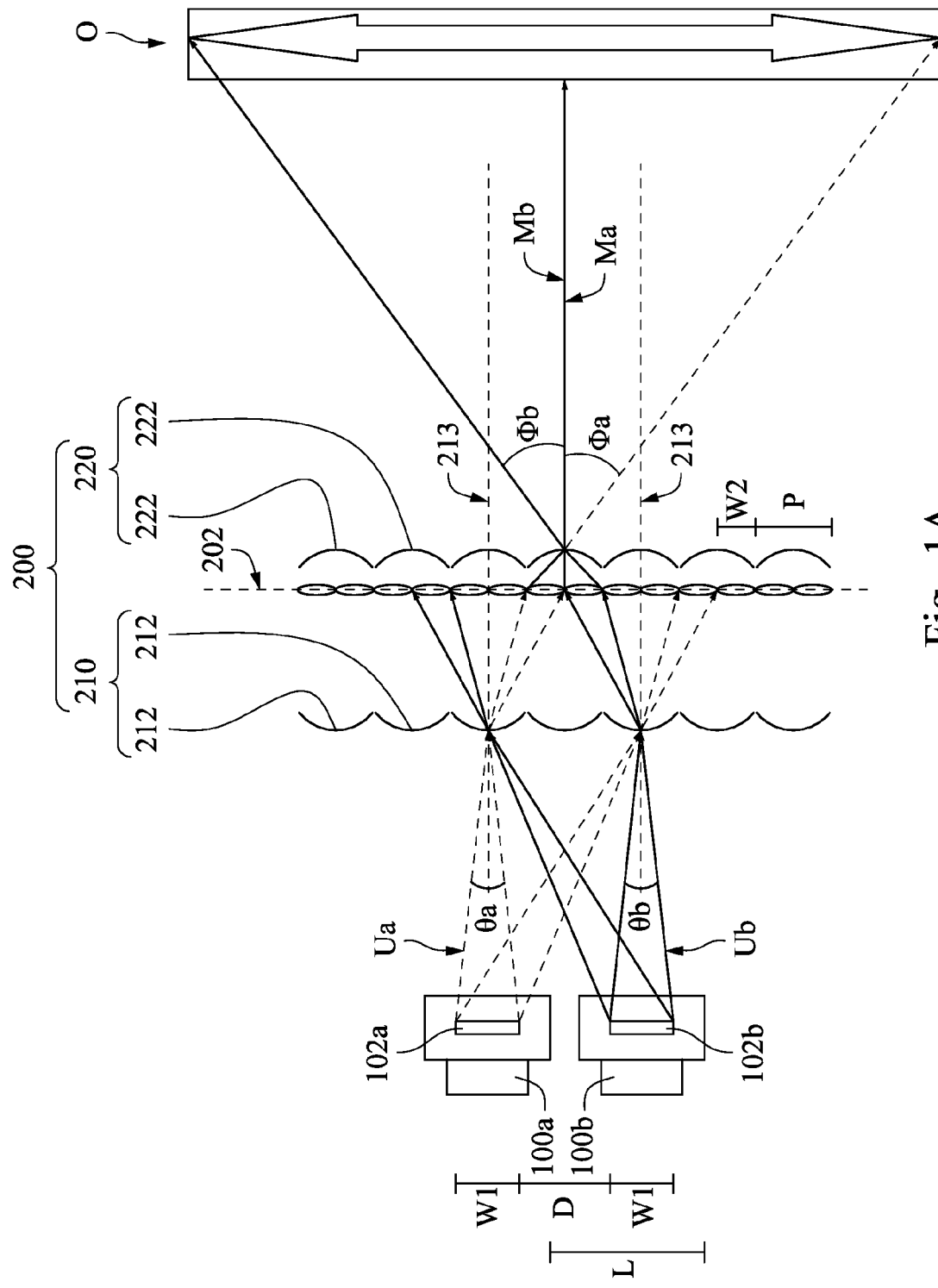
FIG. 1A is a schematic diagram of an autostereoscopic display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
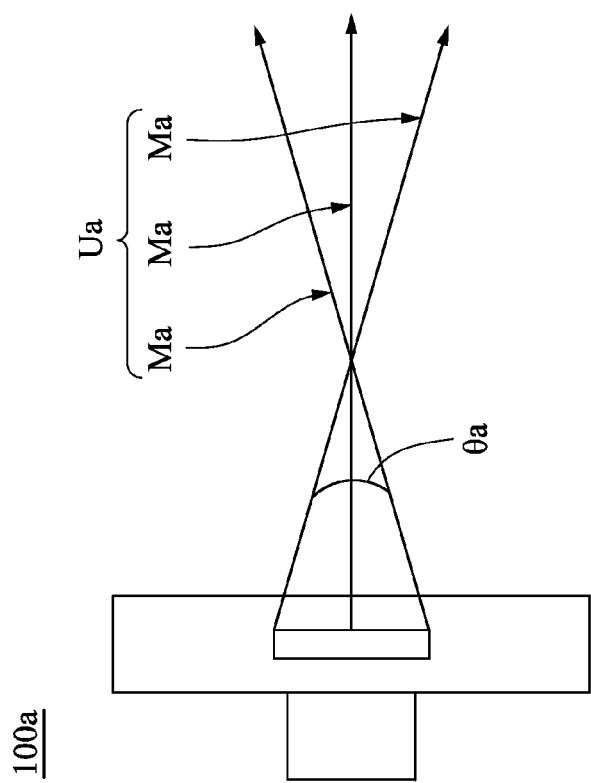
FIG. 2 is a schematic diagram of a projector of FIG. 1A.

FIG. 1A is a schematic diagram of an autostereoscopic display device according to one embodiment of the present invention, and FIG. 2 is a schematic diagram of a projector 100a of FIG. 1A. The autostereoscopic display device includes a plurality of projectors and a screen 200. In the embodiment shown in FIG. 1A, the autostereoscopic display device includes projectors 100a and 100b. Each of the projectors 100a and 100b is configured for providing a lamp image unit. In the embodiment shown in FIG. 1A, the projector 100a is configured for providing a lamp image unit Ua, and the projector 100b is configured for providing a lamp image unit Ub. Each of the lamp image units Ua, Ub has a plurality of lamp images actuated in sequence (to form an array of the lamp images). The lamp images respectively project to different directions to form a projection angle therebetween. In the embodiment shown in FIG. 2, the lamp image unit Ua has a plurality of the lamp images Ma actuated in sequence, and the lamp images Ma respectively project to different directions to form a projection angle θa therebetween. Moreover, referring to FIG. 1A, the projector 100b has a projection angle θb between the lamp images thereof. It is noted that for clarity, dashed lines represent propagation paths of the lamp image unit Ua, and solid lines represent propagation paths of the lamp image unit Ub.

The screen 200 has an image plane 202, and the screen 200 includes a first lens array 210 and a second lens array 220. The first lens array 210 is configured for guiding the lamp image units Ua and Ub to the image plane 202, such that the lamp image units Ua and Ub are adjacent to each other and connected end to end on the image plane 202. The first lens array 210 includes a plurality of first lenticular lenses 212. The second lens array 220 is disposed opposing the first lens array 210. The second lens array 220 is configured for projecting the lamp image units Ua and Ub to an observing surface O. The second lens array 220 includes a plurality of second lenticular lenses 222. Each of the second lenticular lenses 222 is configured for enlarging and combining the projection angles θa and θb of at least two of the lamp image units Ua and Ub adjacent to each other.

Figure 3:
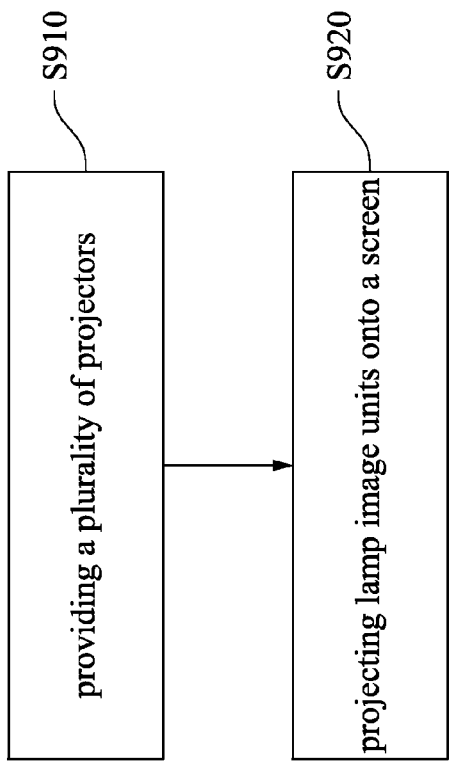
FIG. 3 is a flow chart of an autostereoscopic display method according to one embodiment of the present invention.

FIG. 3 is a flow chart of an autostereoscopic display method according to one embodiment of the present invention. Reference is made to FIGS. 1A and 3. To facilitate a clear description of the autostereoscopic display method, the autostereoscopic display method is applied to, but should not be limited to, the autostereoscopic display device of FIG. 1A. First, in act S910, a plurality of projectors are provided. For example, in this embodiment, the two projectors 100a and 100b are provided. It is noted that the number of the projectors 100a and 100b are illustrative only and should not limit the claimed scope of the present invention. A person having ordinary skill in the art may select a suitable number of the projectors 100a and 100b according to actual requirements.

Subsequently, in act S920, the lamp image units Ua and Ub are projected onto the screen 200. The lamp image units Ua and Ub are firstly projected to the first lens array 210, and the first lens array 210 guides the lamp image units Ua and Ub to the image plane 202, such that the lamp image units Ua and Ub are adjacent to each other and connected end to end on the image plane 202. It is noted that the description of "adjacent to each other and connected end to end" as used herein indicates that the lamp image units Ua and Ub on the image plane 202 adjacently arrange along the same direction, and one end of each of the lamp image units Ua (or Ub) is connected to one end of another of the lamp image units Ub (or Ua). That is, there is no gap between any two adjacent lamp image units Ua and Ub along the arrangement direction. It is noted that in order to clearly illustrate the propagation paths of the lamp image units Ua and Ub, only portions of light of the projectors 100a and 100b are shown in FIG. 1A. In reality, however, the lamp image units Ua and Ub emitted from the projectors 100a and 100b can impinge on the entire first lens array 210, i.e., the lamp image units Ua and Ub impinge on each of the first lenticular lenses 212. Each of the first lenticular lenses 212 is configured for guiding the lamp image units Ua and Ub to different positions of the image plane 202 in such a matter that the lamp image units Ua and Ub on the image plane 202 are adjacent to each other and connected end to end.

Next, at least two of the lamp image units Ua and Ub (in this embodiment, the number is two) on the image plane 202 are guided to the same second lenticular lens 222 of the second lens array 220, and the second lens array 220 enlarges and combines the projection angles θa and θb of the lamp image units Ua and Ub and projects the lamp image units Ua and Ub to the observing surface O. To facilitate the description, the first lenticular lenses 212 and the second lenticular lenses 222 are referred to in a sequence from the top to the bottom of FIG. 1A. For example, the uppermost first lenticular lens 212 in FIG. 1A is referred to as the first of the first lenticular lens 212, the first lenticular lens 212 below the first of the first lenticular lens 212 is referred to as the second of the first lenticular lens 212, and so on. In FIG. 1A, the lamp image unit Ua passing through the third of the first lenticular lens 212 and the lamp image unit Ub passing through the fifth of the first lenticular lens 212 are adjacent to each other on the image plane 202, and these two lamp image units Ua and Ub together pass through the fourth of the second lenticular lens 222. The lamp image unit Ua passing through the fourth of the second lenticular lens 222 has a projection angle ϕa that is larger than the projection angle θa, and the lamp image unit Ub passing through the fourth of the second lenticular lens 222 has a projection angle ϕb that is larger than the projection angle θb. Moreover, since the lamp image units Ua and Ub are adjacent to each other, the projection directions of the lamp images Ma and Mb in FIG. 1A are parallel. That is, the projection directions between the projection angles ϕa and ϕb are continuous, and the projection angles ϕa and ϕb can be combined as a projection angle (ϕa+ϕb) with continuous projection directions. Accordingly, the lamp image units Ua and Ub projecting to the observing surface O have the projection angle (ϕa+ϕb).

The configuration of the autostereoscopic display device and the autostereoscopic display method mentioned above can eliminate lamp image dead zones between the projectors 100a and 100b, and can enlarge the projection angles θa and θb of the projectors 100a and 100b so as to enlarge the viewing angle at the observing surface O. More specifically, the autostereoscopic display method mentioned above can be applied to a light field display, which provides a large number, 100+ for example, of views. Projectors with multi-views, such as the projectors 100a and 100b, can be applied to provide such a number of views. If each of the projectors provides 32 views, four of the projectors can provide 128 views to achieve a light field display. However, a lamp image dead zone may exist between projectors due to the configuration of the projectors. The lamp image dead zone generates discontinuous projection angles between views. In other words, the autostereoscopic display device is unable to generate some lamp images with specific projection angles. This problem can be solved by the autostereoscopic display method mentioned above.

In the embodiment shown in FIG. 1A, the projector 100a (100b) has an exit pupil 102a (102b) with a width W1. The lamp image unit Ua (Ub) is projected from the exit pupil 102a (102b). There is a distance L between the projectors 100a and 100b. If L=W1, this indicates that the exit pupil 102a is disposed adjacent to the exit pupil 102b, i.e., there is no lamp image dead zone between the projectors 100a and 100b. In reality, however, the exit pupils 102a and 102b are separated from each other (as shown in FIG. 1A), i.e., (W1/L)<1, due to the configuration limitations of the projectors 100a and 100b. There is no lamp image between the exit pupils 102a and 102b, and a lamp image dead zone D is formed. In this embodiment, however, since the lamp image units Ua and Ub projecting to the image surface 202 are adjacent to each other and connected end to end, i.e., there is no gap between the two adjacent lamp image units Ua and Ub on the image surface 202, the lamp image dead zone D on the image plane 202 can be eliminated, and the lamp image units Ua and Ub projecting to the observing surface O have directional continuity.

Figure 4:
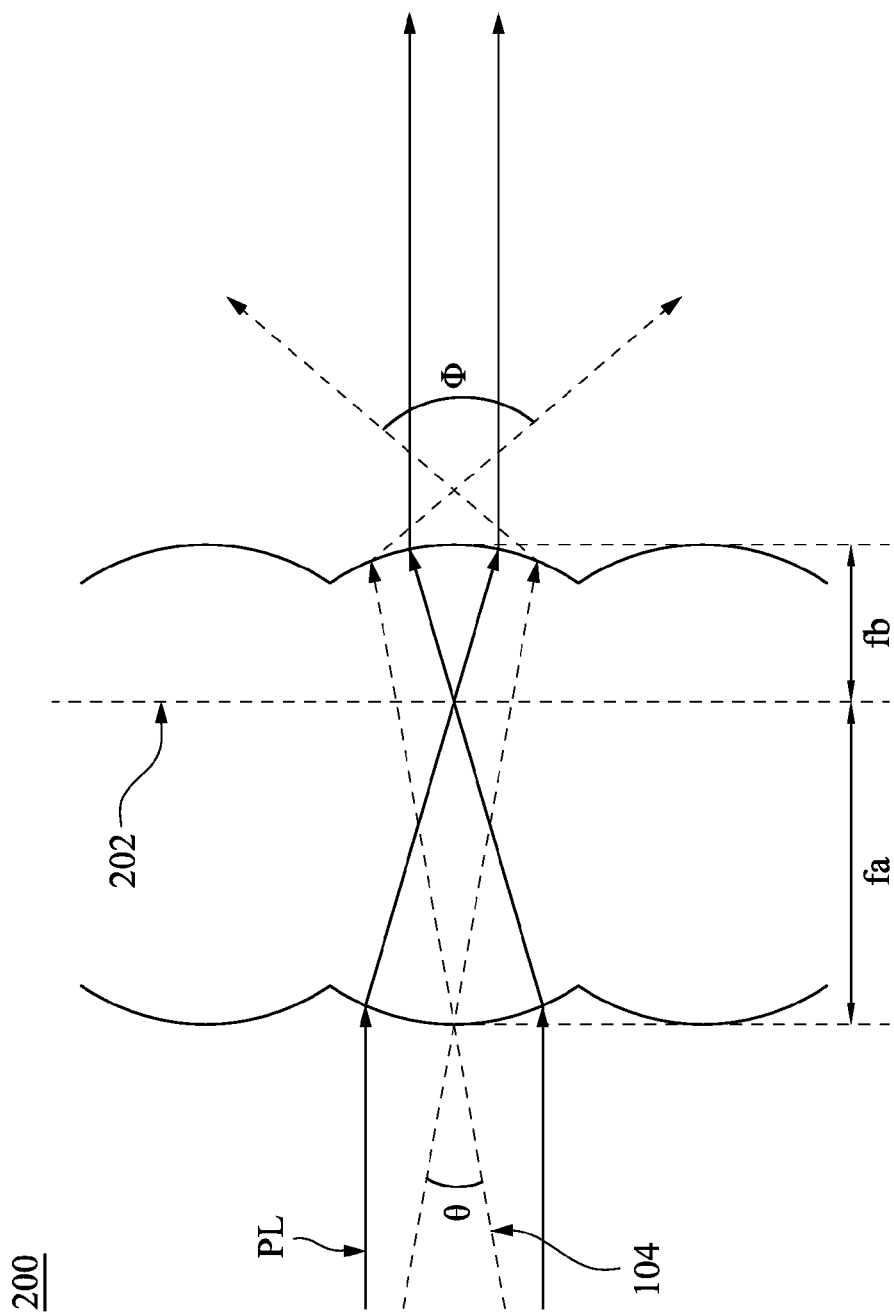
FIG. 4 is an enlarged diagram of a screen of FIG. 1A.

Moreover, in general, the projection angles θa and θb are between 0.5° to 1° due to the limitations of the light modulators' size, the light emitting angles, the widths W1 of the exit pupils 102a (102b) of the projectors 110a (110b), and so on. Reference is made to FIG. 4 which is an enlarged diagram of the screen 200 of FIG. 1A. In this embodiment, a first focus length fa of each of the first lenticular lenses 212 and a second focus length fb of each of the second lenticular lenses 222 can be adjusted, such that the first focus length fa is greater than the second focus length fb. According to the inverse correlation between focus lengths and angles, the focus length gets greater when the angle gets smaller. If the light beam 104 incident the first lenticular lens 212 has an angle θ, and the light beam 104 emerging from the second lenticular lens 222 has an angle φ, since the first focus length fa is greater than the second focus length fb, the angle φ is greater than the angle θ. Therefore, the projection angle can be enlarged. Furthermore, the image plane 202 can be a cofocal plane of the first lenticular lens 212 and the second lenticular lens 222. That is, a parallel light PL incident the first lenticular lens 212 can focus on the image plane 202, and then becomes a parallel light again after passing through the second lenticular lens 222.

Reference is made again to FIG. 1A. In this embodiment, the second lens array 220 has a pitch P, and each of the lamp image units Ua and Ub on the image plane 202 has a width W2. The pitch P is greater than the width W2. Furthermore, the pitch P can be an integer multiple of the width W2. In other words, at least two adjacent lamp image units Ua and Ub can pass through the same second lenticular lens 222, such that the projection angles φa and φb of the lamp image units Ua and Ub can be combined as the projection angle (φa+φb) by the second lenticular lens 222. In the embodiment shown in FIG. 1A, P=2*W2. A projection of each of the second lenticular lens 222 on the image plane 202 covers each one of the lamp image units Ua and Ub. It is noted that although each of the first lenticular lenses 212 is aligned to each of the second lenticular lenses 222 in FIG. 1A, the claimed scope of the present invention is not limited in this respect. In other embodiments, the second lens array 220 can shift 0.5P relative to the first lens array 210 along the arrangement direction of the second lenticular lenses 222. Basically, under the relationship of P=2*W2, an embodiment falls within the claimed scope of the present invention if the projection of each of the second lenticular lenses 222 on the image plane 202 covers each one of the lamp image units Ua and Ub.

To make the projection of each of the second lenticular lenses 222 on the image plane 202 cover each one of the lamp image units Ua and Ub, the autostereoscopic display method can further include off-axis projecting the lamp image units Ua and Ub. The axis is an optical axis 213 of each of the first lenticular lenses 212. The positions of the lamp image units Ua and Ub projecting on the image plane 202 depend on the off-axis angular degrees. Therefore, the lamp image units Ua and Ub on the image plane 202 that are adjacent to each other and connected end to end can be formed by adjusting the incident angles of the lamp image units Ua and Ub projecting on the first lenticular lenses 212.

In one or more embodiments, the lamp image units Ua and Ub passing through the same first lenticular lens 212 of the first lens array 210 can be non-adjacent on the image plane 202. In the embodiment shown in FIG. 1A, for the lamp image units Ua and Ub passing through the third of the first lenticular lens 212, two lamp image units can be inserted between the lamp image units Ua and Ub, and the claimed scope of the present invention is not limited in this respect.

Figure 1B:
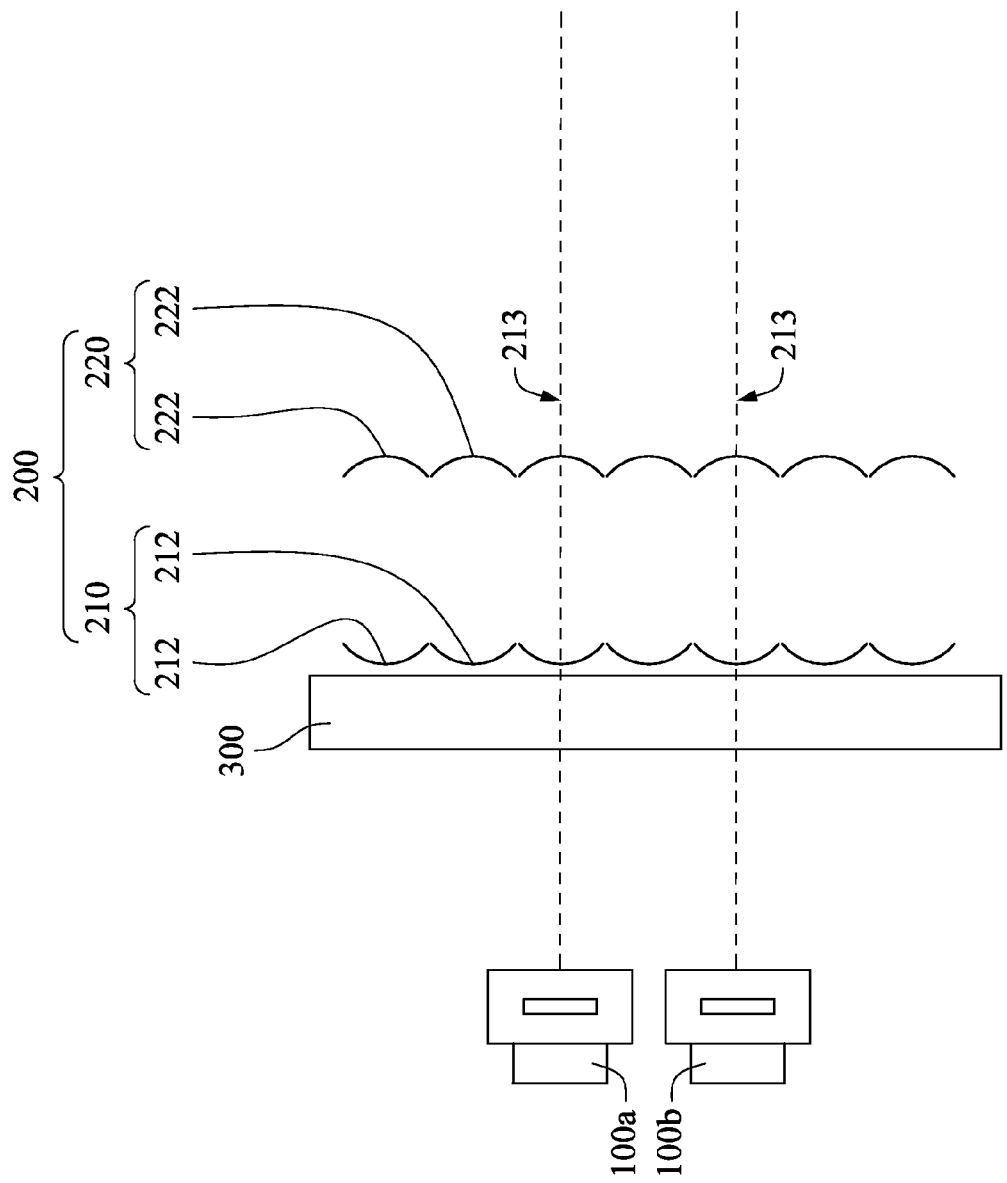
FIG. 1B is a schematic diagram of an autostereoscopic display device according to another embodiment of the present invention.

Reference is made to FIG. 1B which is a schematic diagram of an autostereoscopic display device according to another embodiment of the present invention. In one or more embodiments, the autostereoscopic display method can further include collimating the lamp image units Ua and Ub (see FIG. 1A). For example, the autostereoscopic display device can further include a collimating lens 300 disposed between the screen 200 and the projectors 100a, 100b. The collimating lens 300 can be a Fresnel lens, and the claimed scope of the present invention is not limited in this respect. In this embodiment, the projectors 100a and 100b can be point light sources. That is, the lamp image units Ua and Ub respectively emitted from the projectors 100a and 100b not only respectively have projection angles θa and θb (see FIG. 1A), but also have spreading angles of the point light source, where the spreading angles effect the propagation directions of the lamp image units Ua and Ub in the screen 200. The lamp image units Ua and Ub can be collimated into plane light sources and the spreading angles thereof can be eliminated. Accordingly, the propagation directions of the lamp image units Ua and Ub in the screen 200 depend on the off-axis (the optical axis 213) angular degrees of the projectors 100a and 100b.

Figure 5:
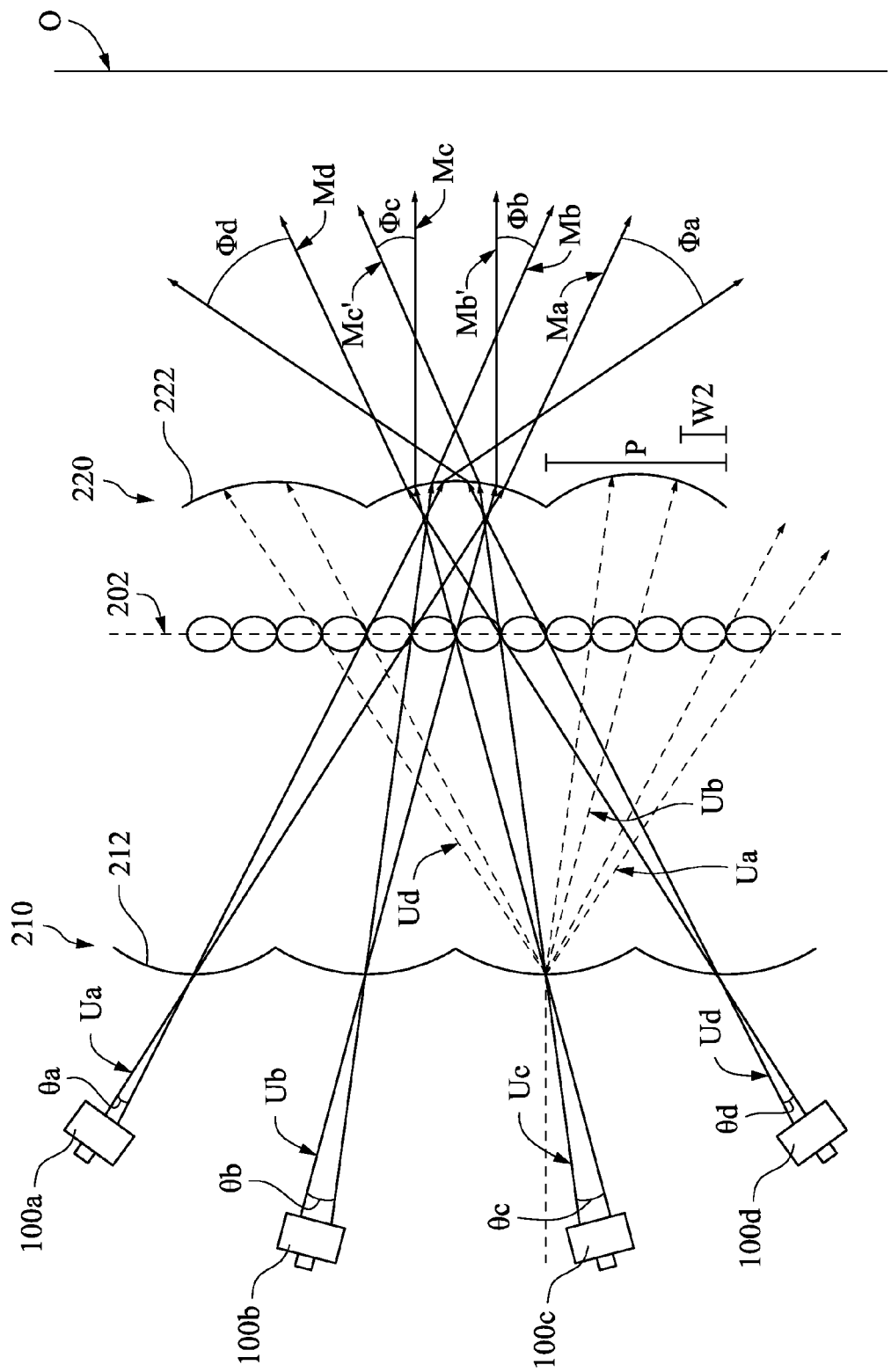
FIG. 5 is a schematic diagram of an autostereoscopic display device according to yet another embodiment of the present invention.

Reference is made to FIG. 5 which is a schematic diagram of an autostereoscopic display device according to yet another embodiment of the present invention. The difference between the present embodiment and the embodiment of FIG. 1A pertains to the number of the projectors and the element configuration of the screen 200. To simplify the illustration of this embodiment, only portions of light beams of the projectors are shown in FIG. 5. In this embodiment, the autostereoscopic display device includes four projectors 100a, 100b, 100c, and 100d respectively providing lamp image units Ua, Ub, Uc, and Ud. The lamp image units Ua, Ub, Uc, and Ud respectively have projection angles θa, θb, θc and θd. It is noted that the positions and the directions of the projectors 100a, 100b, 100c, and 100d in FIG. 5 are illustrative only. The projectors 100a, 100b, 100c, and 100d can be arranged along the same direction as the arrangement of the projectors 100a and 100b in FIG. 1A, depending on actual requirements. Moreover, the dashed arrows represent the propagation paths of the lamp image units Ua, Ub, and Ud passing through the same first lenticular lens 212.

In this embodiment, P=4*W2. That is, the projection of the second lenticular lens 222 on the image plane 202 covers four lamp image units, i.e., the lamp image units Ua, Ub, Uc, and Ud. The end-to-end lamp image units Ua, Ub, Uc, and Ud together pass through the same second lenticular lens 222, such that the projection angles θa, θb, θc and θd of the lamp image units Ua, Ub, Uc, and Ud can be respectively enlarged into projection angles φa, φb, φc and φd. The projection directions of the lamp images Ma and Mb are parallel, the projection directions of the lamp images Mb' and Mc are parallel, and the projection directions of the lamp images Mc' and Md are parallel. Therefore, the lamp image units Ua, Ub, Uc, and Ud projecting to the observing plane O together have a projection angle (φa+φb+φc+φd) with continuous projection directions. Furthermore, although the second lens array 220 shifts 0.5P relative to the first lens array 210, the claimed scope of the present invention is not limited in this respect. An embodiment falls within the claimed scope of the present invention if the projection of each of the second lenticular lenses 222 on the image plane 202 covers each one of the lamp image units Ua, Ub, Uc, and Ud. Other relevant structural details of the present embodiment are all the same as the embodiment of FIG. 1A, and, therefore, a description in this regard will not be repeated hereinafter.

Figure 6:
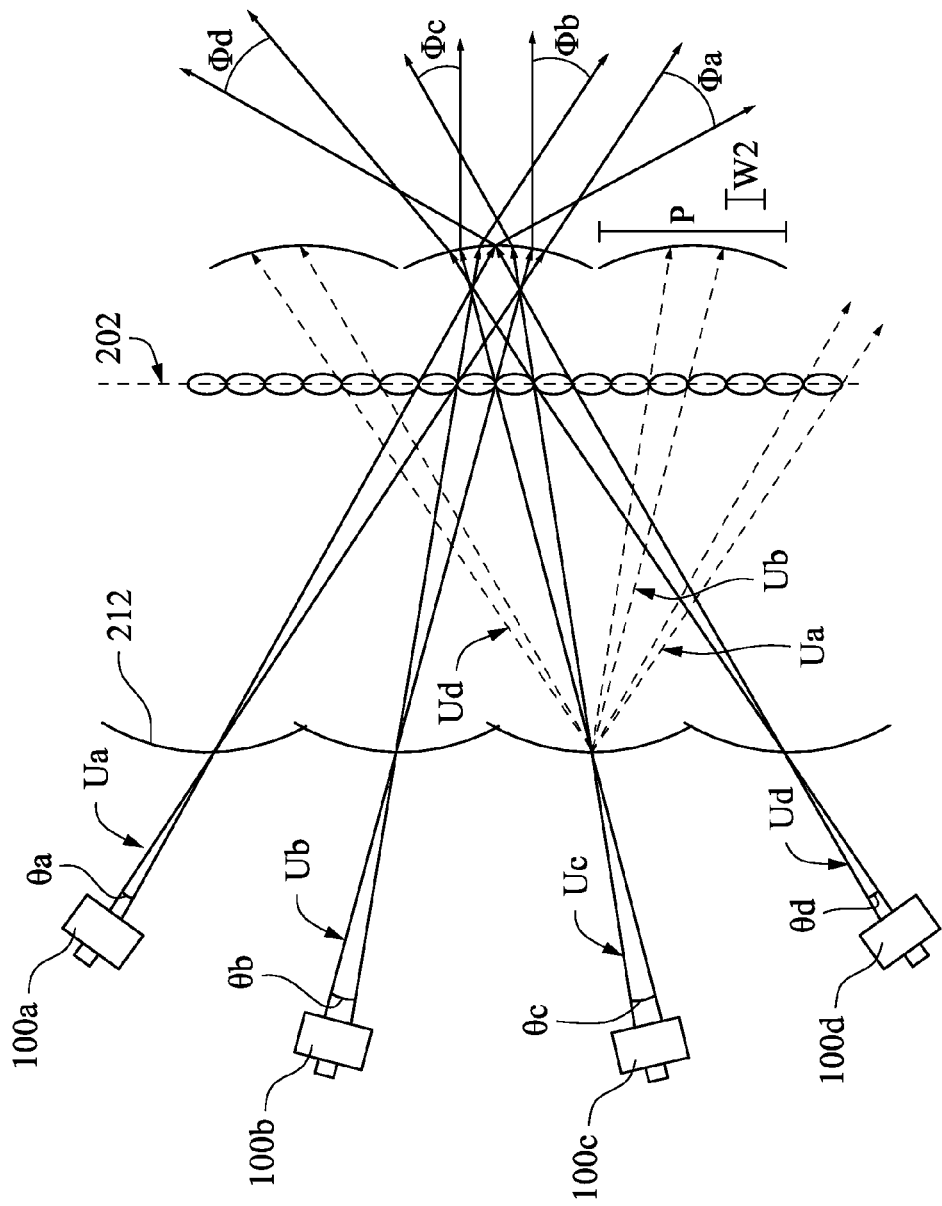
FIG. 6 is a schematic diagram of an autostereoscopic display device according to yet another embodiment of the present invention.

Reference is made to FIG. 6 which is a schematic diagram of an autostereoscopic display device according to yet another embodiment of the present invention. The difference between the present embodiment and the embodiment of FIG. 5 pertains to the relationship between the pitch P and the width W2. In this embodiment, P=5*W2. Other relevant structural details of the present embodiment are all the same as the embodiment of FIG. 1A, and, therefore, a description in this regard will not be repeated hereinafter.

Figure 7:
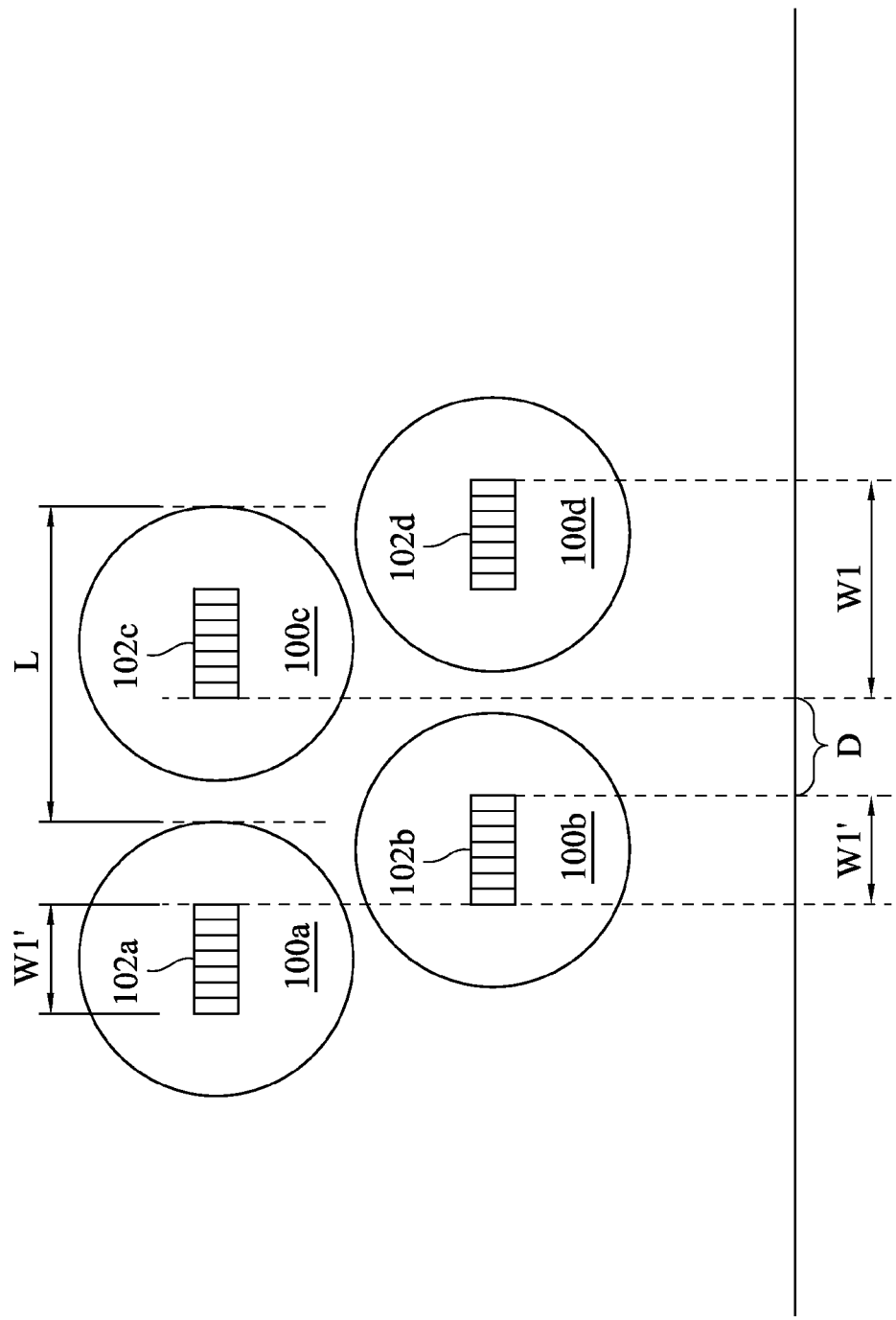
FIG. 7 is a front view of projectors of an autostereoscopic display device according to one embodiment of the present invention.

Reference is made to FIG. 7 which is a front view of projectors of an autostereoscopic display device according to one embodiment of the present invention. Although the projectors of FIGS. 1A, 5, and 6 are all arranged along a single direction, the projectors in this embodiment can be arranged in a stacked and vertically unaligned configuration. As shown in FIG. 7, the projectors 100a, 100b, 100c, and 100d can be arranged in a stacked and vertically unaligned configuration. The projectors 100a, 100b, 100c, and 100d respectively have exit pupils 102a, 102b, 102c, and 102d each with widths W1'. One side of the exit pupil 102a is vertically aligned to one side of the exit pupil 102b. In other words, the exit pupils 102a and 102b can be combined as a single exit pupil with a width W1. Similarly, one side of the exit pupil 102c is vertically aligned to one side of the exit pupil 102d. In other words, the exit pupils 102c and 102d can also be combined as a single exit pupil with a width W1. Hence, a lamp image dead zone D is formed between the exit pupils 102b and 102c. With respect to the configuration in FIG. 1A, if each of the projectors 100a, 100b thereof satisfies the condition: (W1/L)=⅔, the width W1 of each of the exit pupils 102a and 102b of the projectors 100a and 100b of FIG. 1A is (⅔)L. Compared with the embodiment of FIG. 1A, the width W1' of each of the exit pupils 102a, 102b, 102c, and 102d in FIG. 7 can be reduced to (⅓)L to thereby increase the structural flexibility of the projectors 100a, 100b, 100c, and 100d. For example, the size of the light modulator can be reduced, the emitting angle of the light modulator can be smaller, or the distance L between the projectors 100a and 100c can be extended.

Figure 8:
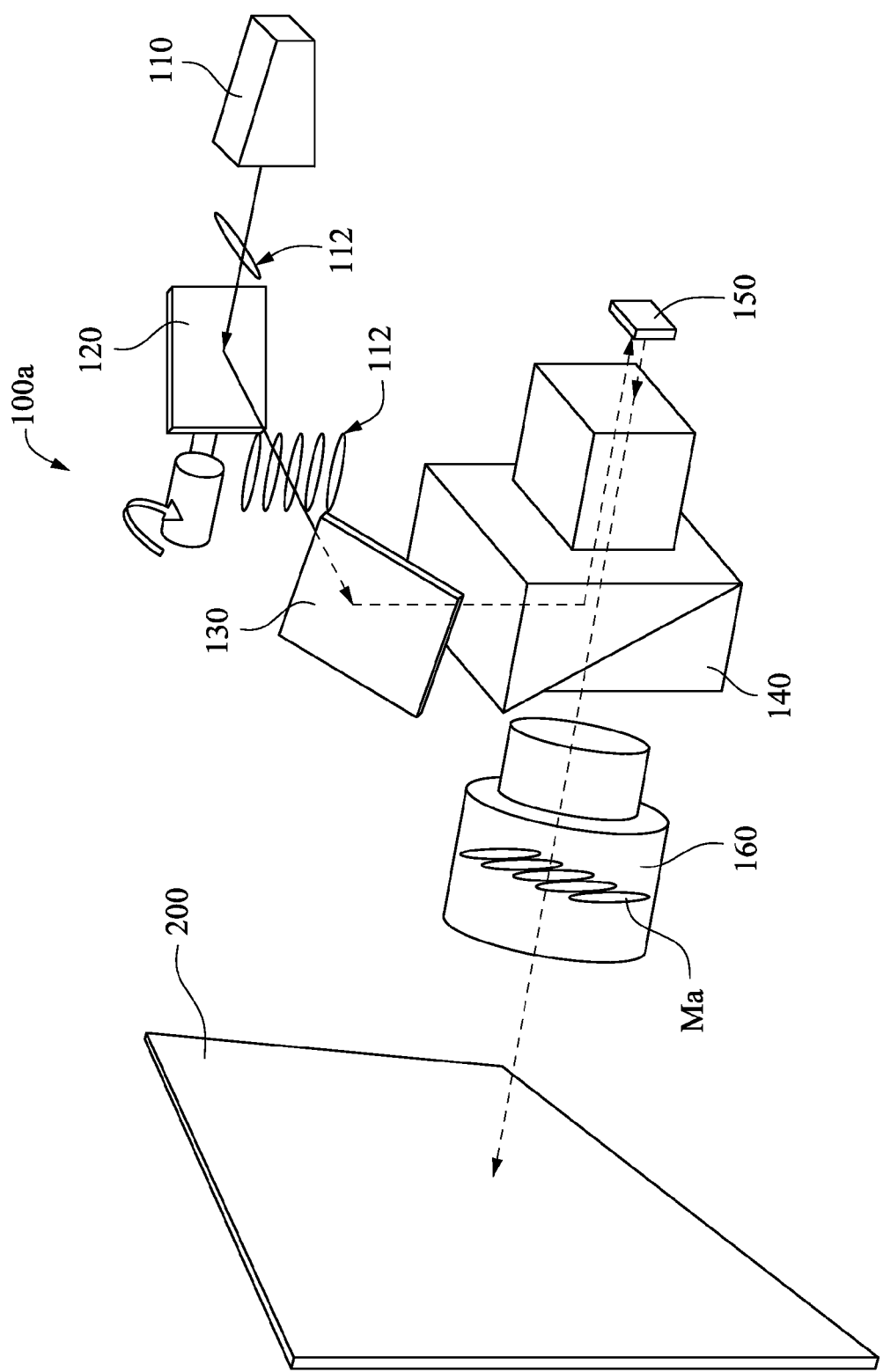
FIG. 8 is a perspective view of the projector of FIG. 1A.

Reference is made to FIG. 8 which is a perspective view of the projector 100a of FIG. 1A. It is noted that even though the projector 100a of FIG. 1A is used as an example in FIG. 8, the projector 100a of FIG. 8 can be applied to any of the autostereoscopic display devices mentioned above according to actual requirements. The projector 100a includes a light source 110, a light deflecting device 120, a reflective mirror 130, a prism group 140, a light modulator 150, and a lens 160. The light source 110 is configured for providing a light beam 112. The light deflecting device 120, which may be a galvanomirror, is configured for deflecting the propagation direction of the light beam 112 in sequence. The reflective mirror 130 is configured for reflecting the light beam 112 that is reflected from the light deflecting device 120 to the prism group 140. The prism group 140 is configured for guiding the light beam 112 that is reflected from the reflective mirror 130 to the light modulator 150. The light modulator 150 is configured for modulating the light beam 112 into a plurality of lamp images Ma in sequence. The prism group 140 is further configured for guiding the lamp images Ma that propagates from the light modulator 150 to the lens 160. The lens 160 is configured for projecting the lamp images Ma onto the screen 200.

Accordingly, in one time period, the light beam 112 emitted from the light source 110 impinges on the light deflecting device 120 so as to be deflected to one direction. Subsequently, the light beam 112 is incident the reflective mirror 130, and is reflected to the prism group 140 by the reflective mirror 130. The light beam 112 is then guided to the light modulator 150 by the prism group 140, and the light modulator 150 modulates the light beam 112 into the lamp image Ma. The lamp image Ma propagates back to the prism group 140 and is guided to the lens 160 by the prism group 140. The lens 160 then projects the lamp image Ma onto the screen 200. In the next time period, the light deflecting device 120 rotates an angle such that the light beam 112 that impinges on the light deflecting device 120 is deflected to another direction. Accordingly, the projector 100a can generate lamp images Ma that propagate to different directions in sequence by rotating the light deflecting device 120. It is noted that the configuration of the projector 100a in FIG. 8 is illustrative only and should not limit the claimed scope of the present invention. Basically, an embodiment falls within the claimed scope of the present invention if the projector can generate lamp images Ma that propagate to different directions in sequence.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An autostereoscopic display method, comprising:
    providing a plurality of projectors, each of the projectors being configured for providing a lamp image unit, each of the lamp image units having a plurality of lamp images actuated in sequence, the lamp images respectively projecting to different directions to form a projection angle therebetween; and
    projecting the lamp image units onto a screen, comprising:
        projecting the lamp image units to a first lens array of the screen for respectively guiding the lamp image units to an image plane of the screen, such that the lamp image units are adjacent to each other and connected end to end on the image plane; and
        guiding at least two adjacent of the lamp image units to the same second lenticular lens of a second lens array of the screen for enlarging and combining the projection angles of the at least two lamp image units and projecting the at least two lamp image units to an observing surface.

2. The autostereoscopic display method of claim 1, wherein projecting the lamp image units onto the screen further comprises:
    adjusting a first focus length of each of a plurality of first lenticular lenses of the first lens array and a second focus length of each of the second lenticular lenses, such that the first focus length is greater than the second focus length.

3. The autostereoscopic display method of claim 1, wherein projecting the lamp image units onto the screen further comprises:
   off-axis projecting the lamp image units, wherein the axis is an optical axis of each of a plurality of first lenticular lenses of the first lens array.

4. The autostereoscopic display method of claim 1, wherein in the act of projecting the lamp image units to the first lens array of the screen, the lamp image units passing through the same first lenticular lens of the first lens array are not adjacent to each other on the image plane.

5. The autostereoscopic display method of claim 1, further comprising:
   arranging the projectors along a single direction or in a stacked and vertically unaligned configuration.

6. The autostereoscopic display method of claim 1, further comprising:
   collimating the lamp image units.

7. An autostereoscopic display device, comprising:
   a plurality of projectors, each of the projectors being configured for providing a lamp image unit, each of the lamp image units having a plurality of lamp images actuated in sequence, the lamp images respectively projecting to different directions to form a projection angle therebetween; and
   a screen having an image plane, comprising:
      a first lens array configured for guiding the lamp image units to the image plane, such that the lamp image units are adjacent to each other and connected end to end on the image plane; and
      a second lens array disposed opposing the first lens array, the second lens array being configured for projecting the lamp image units to an observing surface, and the second lens array comprising a plurality of second lenticular lenses, each of the second lenticular lenses being configured for enlarging and combining the projection angles of at least two of the lamp image units adjacent to each other.

8. The autostereoscopic display device of claim 7, wherein the second lens array has a pitch, and each of the lamp image units on the image plane has a width, wherein the pitch is greater than the width.

9. The autostereoscopic display device of claim 7, wherein the first lens array comprises a plurality of first lenticular lenses, each of the first lenticular lenses has an optical axis, and the lamp image units are off-axis from the optical axis.

10. The autostereoscopic display device of claim 7, wherein the first lens array comprises a plurality of first lenticular lenses, and the lamp image units passing through the same first lenticular lens are not adjacent to each other on the image plane.

* * * * *